United States Patent [19]

Talbott et al.

[11] Patent Number: 5,719,559
[45] Date of Patent: Feb. 17, 1998

[54] SYSTEM AND METHOD FOR THE VERIFICATION OF A DIGITAL CONTROL SYSTEM

[75] Inventors: Kenneth R. Talbott, Gretna; Thomas D. Gahagen, Forest; William T. Dolenti, Lynchburg; David V. Adams, IV, Gretna, all of Va.

[73] Assignee: Limitorque Corporation, Lynchburg, Va.

[21] Appl. No.: 494,156

[22] Filed: Jun. 23, 1995

[51] Int. Cl.$^6$ ................................................ G05B 11/32
[52] U.S. Cl. ........................ 340/825.06; 340/825.16; 364/132; 395/185.02; 395/184.01; 318/565
[58] Field of Search .................. 340/825.06, 825.16; 364/509, 510, 132; 73/861.08; 137/487.5; 251/129.04, 129.05, 129.01; 395/185.02, 185.01, 184.01; 318/565

[56] References Cited

U.S. PATENT DOCUMENTS

| | | |
|---|---|---|
| 4,001,772 | 1/1977 | Powell et al. . |
| 4,085,624 | 4/1978 | Nomura . |
| 4,130,787 | 12/1978 | Allaire et al. ...................... 318/565 |
| 4,274,438 | 6/1981 | La Coste . |
| 4,346,728 | 8/1982 | Sulzer . |
| 4,361,308 | 11/1982 | Bass . |
| 4,443,853 | 4/1984 | Maciolek et al. . |
| 4,542,649 | 9/1985 | Charbonneau et al. . |
| 4,706,703 | 11/1987 | Takeuchi et al. ...................... 137/487.5 |
| 4,725,964 | 2/1988 | Lloyd et al. ...................... 364/509 |
| 4,839,475 | 6/1989 | Wilkinson et al. . |
| 4,940,011 | 7/1990 | Wilkinson et al. . |
| 5,176,037 | 1/1993 | Kasprzyk . |
| 5,339,404 | 8/1994 | Vandling, III . |
| 5,363,025 | 11/1994 | Colling . |
| 5,400,360 | 3/1995 | Richards et al. . |

OTHER PUBLICATIONS

Clark, Robert N. —Chapter 5 "Automatic Feedback Control" in Introduction to Automatic Control Systems (New York, John Wiley and Sons, 1962), pp. 169–184.

*Primary Examiner*—Michael Horabik
*Assistant Examiner*—William H. Wilson, Jr.
*Attorney, Agent, or Firm*—Paul & Paul

[57] ABSTRACT

A verification system monitors the operation of a digital control system in order to insure proper operation. The verification system receives control signals and monitors these control signals to determine whether operation is proper. The digital control system is adapted for operational control of various equipment. The verification system monitors control signals received from the digital control system as well as the status of the equipment, where appropriate, in determining whether the operation of the digital control system is proper. The verification system includes various portions which monitor the control signals at various stages. If there is an error detected at one of the stages, an error signal is generated which prevents operation of the associated equipment.

24 Claims, 3 Drawing Sheets

SYSTEM AND METHOD FOR THE VERIFICATION OF A DIGITAL CONTROL SYSTEM

BACKGROUND OF THE INVENTION

1. Field of the Invention

The present invention relates generally to digital control systems and more particularly to systems for verifying operation of a digital control system.

2. Background of the Invention

Digital control systems of various types are often times used in industry for the control of electro-mechanical equipment. For instance, valve actuators are one example of such types of electro-mechanical equipment which are known to be operable through use of digital control systems. Typically, electro-mechanical valve actuators are used to open and close valves which control fluid flow in a great variety of process environments. For example, electro-mechanical valve actuators are frequently found in power generating stations, oil refineries, and chemical and manufacturing plants, to name just a few. In many of these applications, operation of the particular valve actuator is regulated through use of a digital control system. One type of digital control system is disclosed in U.S. Pat. No. 5,400,360, which is assigned to the assignee of the present application, and is incorporated herein by reference.

An inherent risk with digital control systems is that a failure of the digital circuitry can go undetected, which in some instances can adversely affect the control of the electro-mechanical equipment. For example, failure of the digital circuitry can cause the electro-mechanical equipment to operate unexpectedly or vary from that required by the system. One known technique for monitoring of digital control systems utilizes watch dog timers which are reset by the digital controls at a periodic rate. In particular, if a watch dog timer is not reset, the digital control system reinitializes or enters an inoperable state. The disadvantage with using watch dog timers is that the particular reason for the failure of the system remains undetected, and thus further analysis is required in order to ascertain the particular problem with the digital control system. Another drawback is that watch dog timers do not provide accurate enough monitoring of the digital control system for use in many applications. In particular, there is a period of delay from the point when failure in the digital control system occurs to the point where this is detected by the watch dog timers; in particular when a watch dog timer does not reset. However, in many applications, the operation of the electro-mechanical equipment is required to meet stringent reliability and accuracy standards, and such delay is often times not sufficient in these circumstances. Furthermore, even with applications where accuracy is of less importance, it is still advantageous to quickly detect and react to any system problems, for instance, in order to limit the down time of equipment and technician time required for repair. Accordingly, the present invention has been developed in view of the foregoing and to overcome the deficiencies of the prior art.

SUMMARY OF THE INVENTION

The present invention discloses a system and method for verifying operation of a digital control system; in particular, in order to prevent unexpected operation of equipment responsive to the digital control system. In accordance with the present invention, a verification system is provided which is associated with a digital control system. The digital control system operates by providing at least one control signal to the verification system. The verification system includes a control signal validation means which verifies the control signal received from the digital control system. The verification system also includes drive means for providing at least one operating signal in response to at least one drive signal. A drive validation means is also included which verifies a condition of the drive means. Further, actuating means are provided which is responsive to the operating signal from the drive means for providing at least one output signal from the verification system. A sensor means is provided which is responsive to the output signal for identifying a condition corresponding to the output signal. The verification system includes error detection means which is responsive to the control signal validation means, drive validation means and sensor means for providing at least one error signal. Also drive signal generating means are provided which is responsive to the control signal validation means and error detection means for providing the at least one drive signal to the drive means.

The method in accordance with the present invention is adapted to verify the operation of a digital control system which is used in the control of various types of equipment, in particular electro-mechanical equipment. The method includes the steps of generating at least one control signal, verifying the control signal and generating at least one verified control signal in response. The method also includes the steps of generating at least one operating signal in response to at least one drive signal, verifying the operating signal and generating at least one verified drive signal in response. Also included are the steps of generating at least one output signal in response to the operating signal for controlling the electro-mechanical equipment, and verifying the output signal and generating at least one verified output signal in response. Further, the method includes generating at least one error signal in response to the verified control signal, verified drive signal and verified output signal, and generating the at least one drive signal in response to the verified control signal and the error signal.

It is an object of the present invention to prevent unexpected operation of digitally controlled equipment.

It is another object of the present invention to verify operation of a digital control system in order to regulate the operation of equipment responsive to the digital control system.

Another object of the present invention is to verify the operation of a system used for the verification of operation of a digital control system.

Further, another object of the present invention is to provide the capability of detecting system failures in a digital control system in order to eliminate undesired operation.

Another object of the present invention is to provide accurate and reliable detection of failures in a digital control system, and which can be provided at minimal cost.

These and other objects of the present invention will become more readily apparent when taken into consideration with the following description and the attached drawings.

DETAILED DESCRIPTION OF THE PREFERRED EMBODIMENTS

Figure 1:
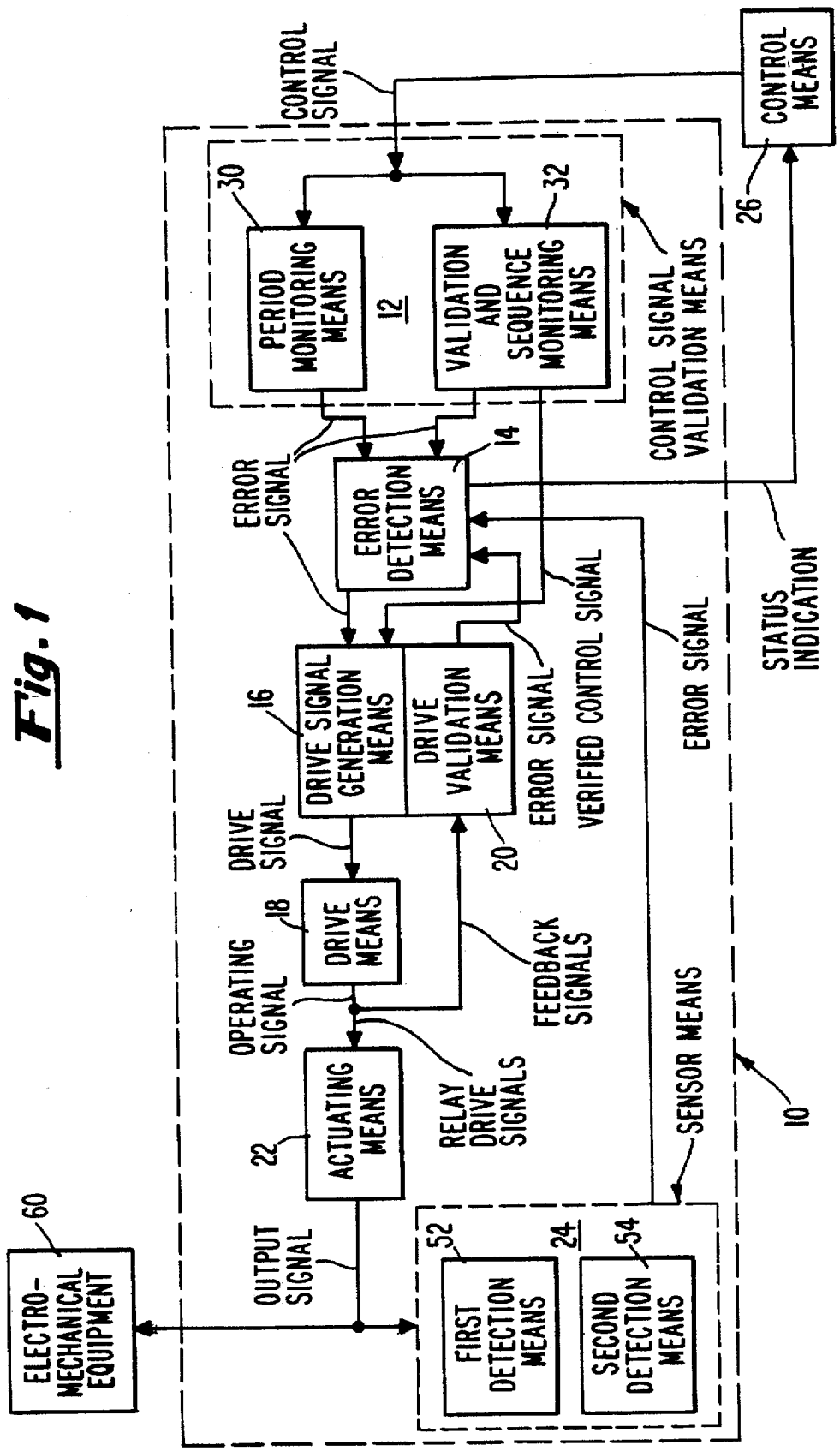
FIG. 1 is a block diagram illustrating an embodiment of a verification system according to the present invention.

Referring now to the drawings in detail, wherein like reference numerals indicate like elements throughout the several views, there is shown in FIG. 1 a block diagram illustrating an embodiment of a verification system in accordance with the present invention. The principal portions of the verification system 10 in FIG. 1 are a control signal validation means 12, an error detection means 14, a drive signal generating means 16, a drive means 18, a drive validation means 20, an actuating means 22 and a sensor means 24. The operation of each of these portions of the verification system 10 will be described in more detail in the following paragraphs.

The verification system in accordance with the present invention is preferably provided in connection with, or a part of, a digital control system. Generally, the verification system of the present invention can be suitable for use with any type of digital control system. One example of a digital control system capable of being used with the verification system of the present invention are those which are adapted for the control of electro-mechanical equipment, and for illustration purposes the remaining part of this application will refer to this example. The operation of the verification system 10 in relation to such a digital control system will be described herein.

In operation of the verification system 10, a control means 26 is preferably provided as either a portion of the verification system 10 or a portion of the digital control system. In many applications, the designation of whether the control means 26 is a part of the verification system 10 or of a digital control system is merely one of semantics; in particular where the verification system 10 is incorporated directly within the digital control system. For reason of this illustration, the control means 26 will be designated as part of the digital control system. The control means 26 in accordance with the present invention is preferably a conventional processing device and operates by placing at least one control signal onto at least one signal line which is connected with the verification system 10. In this embodiment, preferably the control signals placed by the control means 26 correspond with a desired state of operation of the electro-mechanical equipment and other associated devices. Further, in accordance with the present invention, the control signals which are placed by the control means 26 are each preferably waveforms and of defined configuration. The control signals from the control means 26 are routed to the control signal validation means 12 of the verification system 10.

The control signal validation means 12 operates by monitoring the control signals input therein to verify that the waveforms are within specified defined parameters and then outputs at least one verified control signal. In accordance with the present embodiment, the control signal validation means 12 comprises a period monitoring means 30 and a validation and sequence monitoring means 32. Generally, in this embodiment, the control signals from the control means 26 are input into both the period monitoring means 30 and the validation and sequence monitoring means 32. As to the period monitoring means 30, the control signals input therein are debounced and their high and low periods are monitored against defined limits. However, should these limits be exceeded by the monitored periods, an error signal is passed relating to each signal which is found to exceed the defined limits. These error signals are passed to the error detection means 14.

The control signals input into the validation and sequence monitoring means 32 are monitored to verify waveform validity and sequence. As to waveform validity, each of the signals are monitored against defined valid waveforms, and if any deviation is detected, an error is signalled. The sequence of valid waveforms is similarly verified against defined allowable sequences, and should any invalid sequences be detected, an error is signalled. The error signals resulting from either the monitoring of waveform validity, or sequence of valid waveforms are passed to the error detection means 14. However, where it is verified by the validation and sequence monitoring means 32 that waveform validity and the sequence of valid waveforms is within the acceptable limits, at least one verified control signal is then passed to the drive signal generating means 16.

As to the error detection means 14, as noted above, this receives error inputs from both the period monitoring means 30 and the validation and sequence monitoring means 32 of the control signal validation means 12. In addition, the error detection means 14 receives error inputs from the drive signal generating means 16 and the sensor means 24, as will be described below. The error detection means 14 resolves the error inputs into a single error signal which is passed to the drive signal generating means 16. Also, preferably in this embodiment, the error detection means 14 provides a status indication to the control means 26, however this is not required.

The drive signal generating means 16 as noted above receives the verified control signals from the validation and sequence monitoring means 32 of the control signal validation means 12, and also the error signal from the error detection means 14, and generates at least one drive signal to the drive means 18. The drive means 18 in turn generates at least one operating signal in response to each drive signal received from the drive signal generating means 16. The operating signal from the drive means 18 is passed to the drive validation means 20 and the actuating means 22.

In the present embodiment, the operating signals from the drive means 18 are passed as feedback signals to the drive validation means 20. The drive validation means 20 monitors the feedback signals received against defined values in order to determine any malfunction of the drive means 18. If any malfunction is detected, the drive validation means 20 generates at least one error signal to the error detection means 14. In the present embodiment, the drive validation means 20 preferably is provided as a portion of the drive signal generating means 16, however, it should be understood that these portions can also be provided as separate elements without departing from the spirit of the present invention.

The drive means 18 as noted above also passes at least one operating signal to the actuating means 22. In the present embodiment, preferably the operating signals are passed as relay drive signals to the actuating means 22. The actuating means 22 is responsive to the relay drive signals to produce at least one output signal which is passed to the sensor means The sensor means 24 is responsive to the output signals and identifies a condition corresponding to the output signals. In the present invention, preferably the sensor means 24 is adaptable for the detection of failures in the electro-mechanical equipment 60 and to provide an output which indicates failure in the system. In this embodiment, one condition detected by the sensor means 24 is the condition of operation of the actuating means 22. Preferably, a first detection means 52 is provided for this purpose, and if any malfunction is detected, an error signal is passed to the error detection means 14. Another condition which can be identified by the sensor means 24 is that corresponding to the digital control system. For this purpose, a second detection means is provided which is designated by the number 54, however it should be understood that the second detection means 54 is not required and can be eliminated.

In addition to passing the output signals to the sensor means 24, the actuating means 22 also passes the output signals to the electro-mechanical equipment 60 in accordance with the control of this device.

Figure 2:
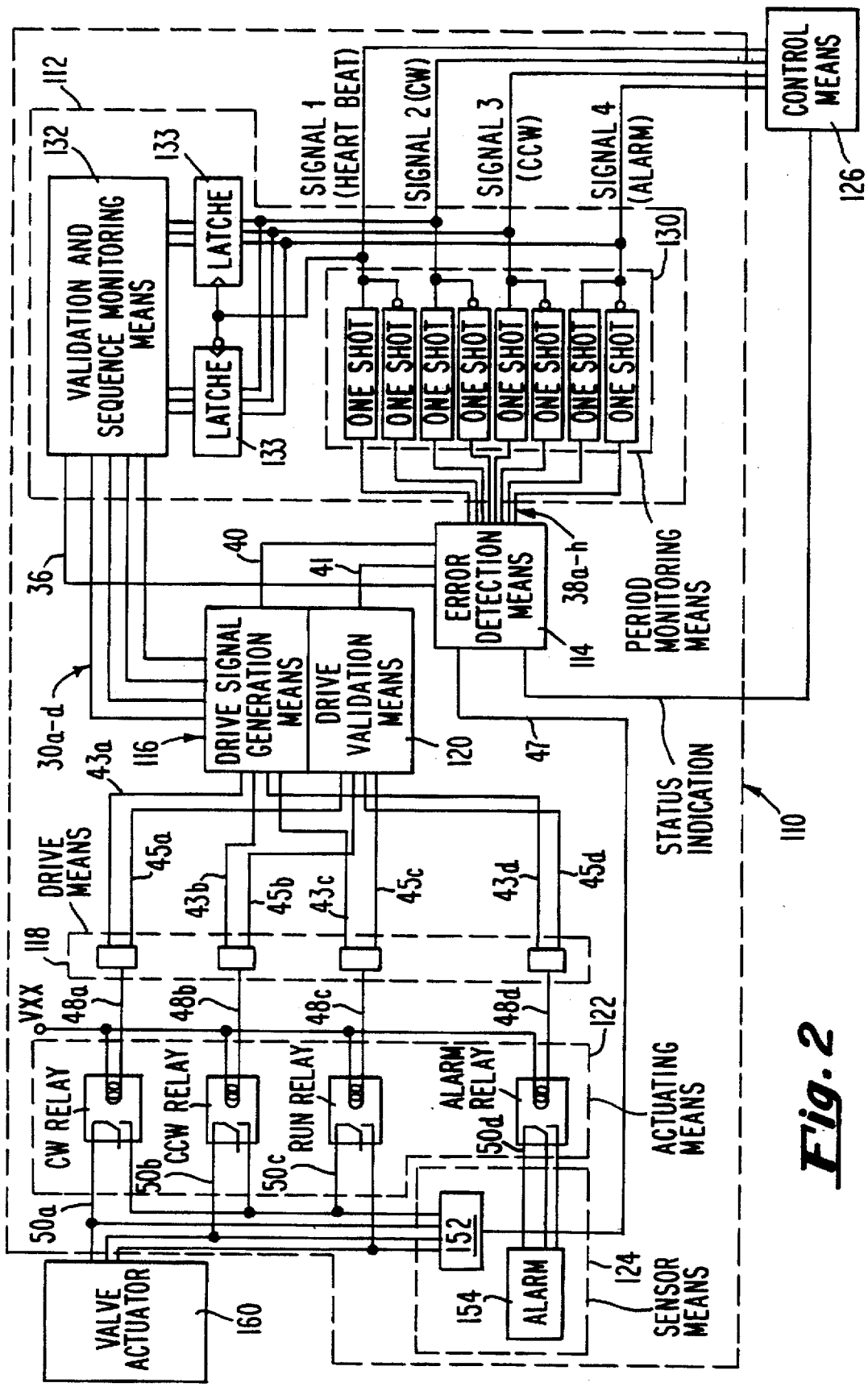
FIG. 2 is a block diagram illustrating a preferred embodiment of a verification system according to the present invention.

A preferred embodiment of the verification system 10 illustrated in FIG. 1 is shown in FIG. 2. In FIG. 2 the portions corresponding to those identified in FIG. 1 are illustrated by using the same number designations beginning with 100. In this embodiment, the control means 126 places four control signals onto four signal lines identified as 28 a through d which are received by the verification system 110. As noted earlier in relation to the embodiment describing the verification system 10, preferably the four control signals correspond with the desired state of operation of the associated electro-mechanical equipment and other associated devices, which in this embodiment comprises a valve actuator. As was described in the background of the invention, a valve actuator is one particular type of electro-mechanical equipment which is known to be operable for use of digital control systems. Accordingly, in the present embodiment, the four control signals generated by the control means 126 are associated with the operational specification of the valve actuator which is designated by the number 160 in FIG. 2. As to the configuration of the four control signals, similar to the earlier embodiment of the present application, the four control signals each are waveforms of a defined configuration, and each particular control signal provides an independent operation. In the present embodiment, the first control signal 28a operates as the heartbeat for regulating the verification system 110, the second and third control signals 28b and c direct the clockwise and counterclockwise movements of the valve actuator, respectively, and the fourth signal 28d operates as an alarm signal. The details of each of these signals will be described more fully below.

The four control signals passed from the control means 126 are input into a control signal validation means 112 which comprises a period monitoring means 130 and a validation and sequence monitoring means 132 similar to that earlier described. In the present embodiment, the period monitoring means 130 comprises eight one-shot timers, with each pair of one-shot timers receiving one of the four control signals and the inverse of that signal. Generally, the specification of the digital control system imposes minimum and maximum frequency and duty cycle requirements upon the signals received from the control means 126. As described earlier, the control signals are debounced and in this embodiment the eight one-shot timers monitor each line for time high and time low of each signal, and should any of these signals remain high or low too long compared with the defined limits allowed by the specification, this is detected and an error signal is passed to the error detection means 114 over lines 38a–h.

The control signals input into the validation and sequence monitoring means 132 in this embodiment are latched on rising and falling edges of the heartbeat signal by the latch gates 133. On each edge of the heartbeat signal, the state of the latched data is compared with acceptable combinations defined by the specification. The specification defines only certain waveforms on each signal line as valid control patterns, and all others are recognized as errors which generate an error signal from the validation and sequence monitoring means 132 to the error detection means 114. In the present embodiment, preferably the defined waveforms imposed by the specification require that the clockwise signal, the counterclockwise signal and the alarm signal have different states on the heartbeats rising and falling edges. Where it is verified that the control signals are within the acceptable limits, the four verified control signals are passed to the drive signal generating means 116 over the lines 30a–d.

In this embodiment, the drive signal generating means 116 includes the drive validation means 120 as described in the earlier embodiment. The drive signal generating means 116 accordingly receives the verified control signals from the validation and sequence monitoring means 132, the consolidated error signal from the error detection means 114 which is over the line 40, and receives feedback signals from the drive means 118. Preferably, the design of the drive means 118 which will be described in more detail below dictates that the drive signals from the drive signal generating means 116 be comprised of pulsing waveforms of specified high duty cycle. However, should the duty cycle fall too low, or the waveforms stop in either a high or low state for a specified period of time, the drive means 118 will, by design, shut off. In the present embodiment, the drive signal generating means 116 provides four drive signals over the lines 43a–d to the drive means 118.

The drive means 118 in this embodiment comprises four drive members, with each drive member having an input in connection with one of the output lines 43a–d from the drive signal generating means 116. Similarly, each of the drive members generates a feedback signal over lines 45a–d which is past back to the drive validation means 120 of the drive signal generating means 116. Similar to that earlier described, each of the feedback signals from each of the drive members are monitored against defined values to verify the operation of each particular drive member. The malfunction of any of the drive members results with the passage of the error signal to the error detection means 114 over the line 41.

The actuating means 122 similar to the verification system 10 receives the operating signals as relay drive signals from the drive means 118. In the present embodiment, the actuating means 122 comprises four relays, with each relay receiving one of the four relay drive signals from a particular drive member. As illustrated in FIG. 2, the relay drive signals generated by the drive members are passed to the four relays over lines 48a–d. Three of the relays in turn engage the contactor integral to the valve actuator over lines 50a–c for providing motor control. In this embodiment, each of the three relays is specified for particular actuator operation, and the particular relay which is active is dependent on the actuator action that was requested by the control means 126 when placing the control signals on the four signal lines 28a–d. In this preferred embodiment, one relay is adapted to regulate clockwise action of the motor, one relay to regulate counterclockwise action of the motor and the third relay to regulate when the motor is running. A fourth relay is provided which is in engagement with the second detection means 154 of the sensor means 124 by lines 50d, similar to that described in relation to the verification system 10. The fourth relay is also responsive to the control signals generated by the control means 126, and when active generates an output signal to the second detection means 154. As indicated earlier, preferably the second detection means 154 provides an output indicating the failure in the system. In the present embodiment, the second detection means 154 comprises an alarm mechanism which is used to provide an indication of the status of the digital control system. Similarly, the remaining three relays are also provided in engagement with the first detection means 152 of the sensing means 124. The first detection means 152 in this embodiment is adapted to provide monitoring of the three relays as well as the contactor coils in order to detect any failure in these portions. Further, although not shown, in the present embodiment, preferably the first detection means 152 is provided directly on the coils of the contactor.

Figure 3:
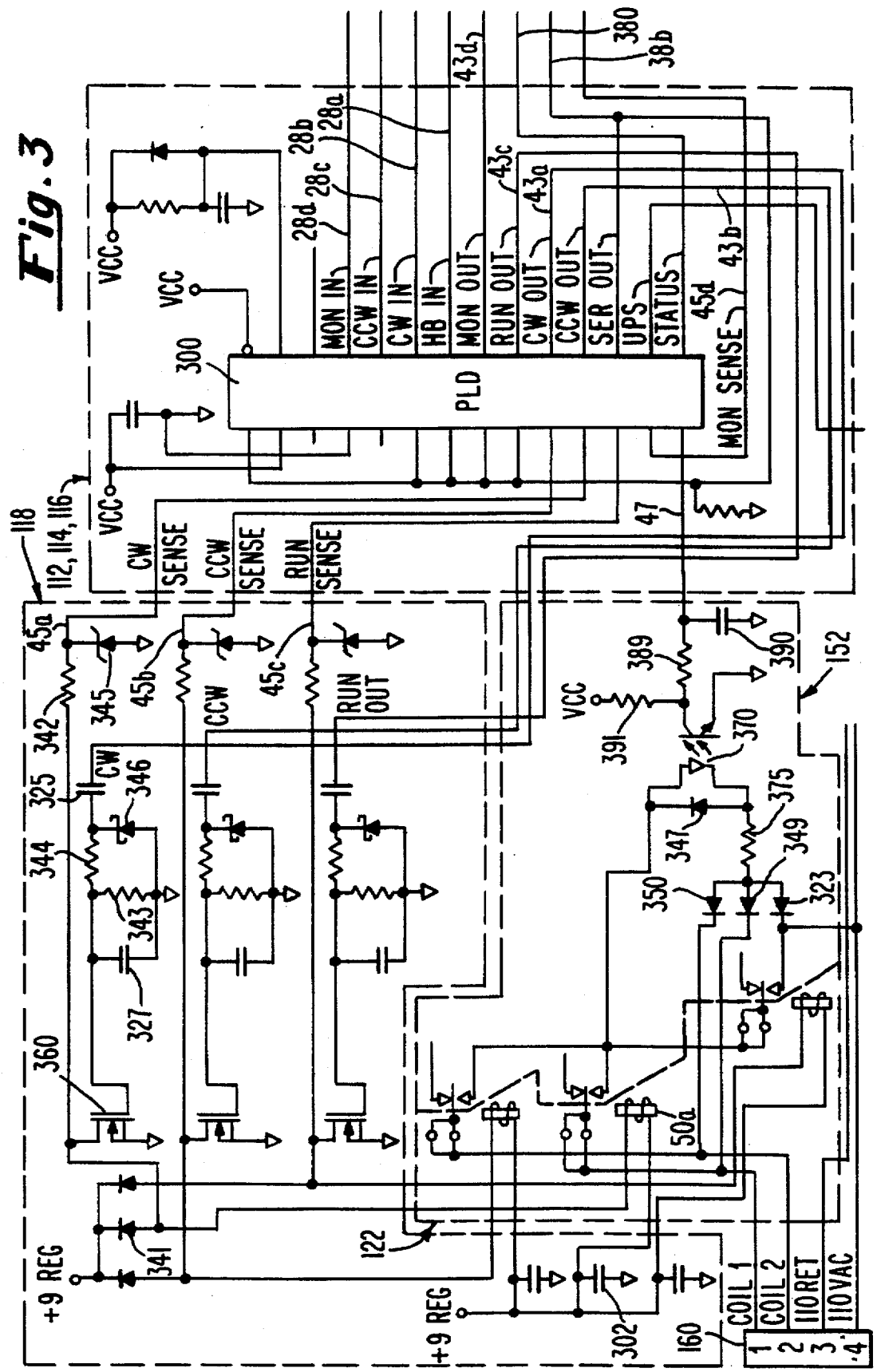
FIG. 3 is a partly schematic, partly block diagram illustrating an exemplary embodiment of the processing electronics of the verification system according to FIG. 2.

FIG. 3 illustrates a partly schematic, partly block diagram of an exemplary embodiment of the processing electronics of the verification system 110 according to FIG. 2. In FIG. 3, the components corresponding to the portions shown in block diagram in FIG. 2 are blocked with dotted lines and have the same number designations as that in FIG. 2. As illustrated, the control signals 28a–d which are passed from the control means 126 (not shown) are input into a programmable logic device (PLD) 300. In this embodiment the PLD 300 is an application specific integrated circuit which incorporates the operations of the control signal validation means 112, error detection means 114 and drive signal generating means 116 and is constructed in a conventional manner. For example, the PLD 300 can comprise a commercially available chip manufactured by Microchip Technology, Inc., Part No. PIC16c55/57. Preferably in this embodiment, the status indication which is passed from the error detection means 114 shown in FIG. 2 is passed from the PLD 300 over the line 380 as shown. Additionally, a power source (not shown) is also provided which is in connection with the PLC 300 over the UPS line 384. In addition, a SER out line 386 is also shown which is in connection with the PLC 300 and the control means 126 which is adapted for the transmission of diagnostic information where desired. The PLD 300 in turn outputs three drive signals over the lines 43a–c to the three corresponding drive members of the drive means 118. The three drive members in turn generate the feedback signals back to the PLD 300 over the lines 45a–c as shown. In the present embodiment, the construction of each of the drive members of the drive means 118 are the same, and for illustrations purposes the operation of the drive member connected with the lines 43a and 45a will be described in the following paragraph.

In the present embodiment, the drive signal which is input into the drive member can preferably be placed in two states. The first state is an inactive, constant voltage state and the second is an active high duty cycle, high frequency pulsing state. In situations where the state of the drive signal is at any DC voltage, any voltage which is on a capacitor 327 will be reduced to 0 volts via discharge through a resistor 343. When the voltage is reduced to below approximately 2 volts, a field effect transistor 360 will cease conducting current, and the current through the coil of the relay 50a will cease, causing the relay to return to its inactive state. In this manner, the drive means inherently returns to an inactive condition.

In situations where the drive signal is in the active state, generally the drive signal is alternating between approximately 5 volts and 0 volts. The frequency of the wave is high with the duty cycle also high, and thus the period of the signal's low voltage condition is very short. As the drive signal rises from the low voltage state to the high voltage state, the negative terminal of a capacitor 325 also rises. This causes current to flow through a resistor 344 which charges the capacitor 327. As indicated above, the resistor 343 during this same time period is continuously acting to discharge the capacitor 327. Preferably in this embodiment the value of the resistor 344 is much smaller than the value of the resistor 343, and accordingly the discharging effect is overwhelmed by the charging effect shortly after the drive signal transitions to its high voltage level. As the drive signal remains high, the capacitor 325 charges as current flows from the negative terminal. Preferably, the value of the capacitor 325 is much larger than the value of the capacitor 327, and in this arrangement the capacitor 327 charges to a high voltage much quicker than the capacitor 325 charges. Then following an appropriate period where the drive signal has remained high, the drive signal transitions to its low voltage or ground state. At this point any charge which flowed from the negative terminal of the capacitor 325 during the charging phase appears as a lower voltage on the negative terminal of the capacitor 325. Then as the voltage of the drive signal falls towards 0 volts, a diode 346 will become forward biased because of the charge on the capacitor 325. The diode 346 will in turn rapidly conduct current to discharge the capacitor 325 to approximately 0.2 volts. After which, the drive signal is again transitioned to its high voltage state. However, while the drive signal is at its low voltage state, the resistor 344 is acting in parallel with the resistor 343 to discharge the capacitor 327.

As noted above, the field effect transistor 360 is connected with the relay 50a, and as illustrated these are in turn connected with a diode 341 and a capacitor 302. In this arrangement both current and voltage spikes which are associated with switching the inductive load of the relay coil are limited.

The feedback signal which is passed from the drive member over the line 45a is achieved by a resistor 342 and Zenor diode 345. When the field effect transistor 360 is inactive and not conducting, the resistance of the relay coil 50a is in series with the resistor 342. In this configuration, since one terminal of the relay coil 50a is connected to the 9 volt system supply as shown, current flows through each of these two resistive elements in order to raise the voltage of the feedback signal. However, the voltage of the feedback signal is limited to a safe value by the Zenor diode 345. Preferably, the value of the resistor 342 is selected such that the normal current is limited to a value well below any which will actuate the relay 50a. In situations when the field effect transistor 360 is active and conducting, the voltage of the feedback signal is reduced to near 0 volts.

In operation of the first detection means 152, a signal is derived by utilizing the low resistance of the internal contactor coils of the valve actuator 160, in conjunction with the contacts of three relays 50a–c of the actuating means 122, together with the 120 volts AC power source of the electromechanical equipment as shown. The wiring among these parts are connected via a diode bridge circuit comprised of diodes 323, 349 and 350. In operation, the diode bridge circuit directs a very small current, limited by a resistor 375, through the input diode of an opto-isolator 370. This arrangement allows the use of the detection circuit on high voltage systems because the opto-isolator and diodes are commonly available with very high voltage ratings. The output transistor of the opto-isolator 370 is pulled up to the digital power supply with a resistor 391 and debounced by a resistor 389 and a capacitor 390.

The fourth drive member of the drive means 118 illustrated in FIG. 2 although not shown in FIG. 3 is of the same configuration as that of the other three drive members. In the present embodiment, preferably the fourth drive member is provided on another PC board and is in connection with the PCD 300 by the lines 43d and 45d. Similarly, the alarm relay 50d identified in FIG. 2 is of the same configuration as the alarm relays 50a–c described in FIG. 3, although is not shown for the sake of brevity. The alarm relay 50d in turn is output to the second detection means 154 which, as indicated in relation to the second embodiment of the invention, comprises an alarm mechanism. Generally, as noted earlier the alarm mechanism can be of any suitable construction in order to provide an output indication as to the status of the digital control system. For instance, in some applications the alarm mechanism can be a separate unit or can be a part of a microprocessor device, as examples. The remaining components illustrated in FIG. 3 are familiar to those of ordinary skill in the art and are thereby not described in detail for the sake of brevity.

It should be understood that the foregoing discussion is of only one example of the processing electronics suitable for use with the present invention. Rather, the processing electronics of the present invention can be constructed using any suitable component parts such as commercially available integrated circuits.

In view of the foregoing, it will be understood that there are several advantages to the verification system of the present invention. One advantage is to provide a control signal in the form of a complex waveform which is received by the verification system from a control means. In particular, the configuration of the waveforms from the control means are required to conform to certain specifications in order to maintain proper operation of the digital control system as well as the equipment to which the digital control system is connected to. As noted earlier, at least one waveform is generated from the control means and this number can be varied to provide any number of waveforms to the verification system. In the preferred embodiment of this invention, an example is shown where four waveforms are generated. The waveforms as they are passed through the verification system are monitored and changed at different points in the system, and at any one of these points if it is determined that the waveforms are not present or are invalid, a failure of the digital controls has occurred and the verification system will respond accordingly, such as preventing further operation of the digital control system.

One particular portion of the verification system which monitors the waveforms is the control signal validation means. As indicated earlier, the control signal validation means includes the period monitoring means and validation and sequence monitoring means which each monitors the signals from the control means to determine if such are within defined parameters. As to the period monitoring means, this monitors the high and low periods of the waveforms, and if the signals remain high or low too long this is detected and an error signal is generated. One particular advantage of the period monitoring means is that it protects against open signal wires, shorted high or low signal wires, drive chip failures, and most failure modes of the control means, and the period monitoring means will generate an error signal in response which will terminate operation of the system.

Similarly, there are particular advantages to the validation and sequence monitoring means. Generally, as noted earlier, the validation and sequence monitoring means determines whether the waveforms conform with valid specified patterns, including waveform validity and sequence, and if there is any deviation from that required, an error signal is also generated. Also, as described in relation to the preferred embodiment of the present invention, the specification of allowable waveforms require that the waveforms of the clockwise, counterclockwise, and alarm signals have different states on the heartbeat signal's rising and falling edges. The advantage here is that it provides for the detection of wires which are shorted together and this is interpreted as an error condition. Also, another advantage is that a run-away condition associated with the control means will not be expected to cause actuator motion.

Still another advantage is in the relationship between the drive signal generating means, the drive validation means, the drive means and the actuating means. In particular, the drive signal generating means produces the drive signals, which correspond to the status of the verified control signals from the validation and sequence monitoring means, only when there has not been any error signal input from the error detection means. This insures that the drive signal commands will only be generated when there is no previous error detected in the system. Similarly, the operating signals from the drive means are past as feedback signals to the drive validation means which operates to verify the operation of the drive means. These feedback signals are verified against predefined parameters of these signals, and if any variation is detected, this will also cause the generation of an error signal to the error detection means, which in turn will generate a signal to the drive signal generating means that an error has been detected. Furthermore, another advantage noted in the preferred embodiment of the present invention is that in the design of the drive means, it is required that the operating signal which is passed to the actuating means as relay drive signals are a pulsing waveform of specified high duty cycle. However, should it be detected that the duty cycle fall too low, or the waveforms stop in either high or low state for a specified time period, the drive means will cease operation. Accordingly, any steady state condition of the waveform signal from the drive means will cause the corresponding relay of the actuating means to disengage. As noted above, the operation of the drive means is regulated by the drive validation means by monitoring the feedback signals, and any such malfunctions will produce the error signal to the drive signal generating means which will cease operation of the drive means. Also this particular function is implemented in a minimum number of components which will insure proper operation even in the event of massive failures in the system. Accordingly, the advantages of these particular portions of the verification system is that failure in a drive means component, relay or power supply is detected.

Another advantage is due to the relationship between the actuating means and sensing means of the present invention. In particular, the first detection means of the sensor means monitors the actuating means to detect any failure. In particular, as described in relation to the preferred embodiment of the present invention, the detection means operates to monitor the three controlling relays in order to detect failure in these devices. As noted in FIG. 3 of the present invention, preferably the first detection means is adapted to monitor the contacts on the relays which will detect if any relay contact has been welded shut through the application of excess current. Further, as noted in the preferred embodiment of the present invention, the detection means can be positioned on the coils of the contactor in order to also monitor proper functioning of the contactor coils. Further, still another advantage is that the second detection means of the sensor means can also be provided and is in contact with the alarm relay which is adapted to provide an indication as to the status of the system to an operator of the system.

In view of that set forth above, it should be understood that it is an advantage of the present invention to provide various levels of protection against electric, electronic, wiring, and mechanical faults and failures in an actuator. In particular, failures in the control means which generates the control signals or wiring will be detected, and thus not allow any actuator action. Further, the power devices, relays and contactor are all monitored for any failures to add another tier of protection. Additionally, should there be any detection of component failure or fault, the drive means inherently acts to prevent actuator action. Further, any detection of such foregoing failures by the present invention will result in the triggering of an alarm which will give an immediate indication of the status of the system.

In view of all of that set forth above, it will be recognized by those skilled in the art that changes may be made by the above described embodiments of the invention without departing from the broad inventive concepts thereof. For example, the control signals generated by the control means are described as being configured as waveforms which are monitored by the verification system. However, while a waveform is a preferred control signal, other types of signals can also be used for the same purpose. In particular, the main feature here is that the verification system of the present invention be adapted to monitor the status of the control signals, for instance against predefined signals, in order to provide sufficient operation of the system. Further, it should be understood that each of the portions which are described in relation to the verification systems 10 and 110 are not required to be implemented in order to provide sufficient operation. In particular, it is not required that a status indication be given to the control means from the error detection means. Similarly it is not required to have the second detection means of the sensor means or the alarm relay and associated drive member of the drive means, where the signalling of an alarm associated with the operation of the equipment is not desired. Similarly, other portions of the verification system of the present invention also do not have to be provided in other applications where this would be appropriate. It is understood, therefore, that this invention is not limited to the particular embodiments disclosed, but it is intended to cover all modifications which are within the scope and spirit of the invention as defined by the appended claims.

We claim:

1. A verification system for use in a digital control system, the digital control system providing at least one control signal to said verification system, said verification system comprising:

control signal validation means for verifying said control signal received from said digital control system;

drive means for providing at least one operating signal in response to at least one drive signal;

drive validation means for verifying a condition of said drive means;

actuating means responsive to said operating signal for providing at least one output signal from said verification system;

sensor means responsive to said output signal for identifying a condition corresponding to said output signal;

error detection means responsive to said control signal validation means, drive validation means and sensor means for providing at least one error signal; and drive signal generating means responsive to said control signal validation means and said error detection means for providing said at least one drive signal to said drive means.

2. A verification system according to claim 1, wherein said control signal defines a waveform of a defined configuration including at least one high period and at least one low period.

3. A verification system according to claim 2, wherein said control signal validation means comprises period monitoring means for monitoring said high periods and said low periods of said control signal against defined limits, wherein said period monitoring means provides at least one error signal to said error detection means when said defined limits are exceeded.

4. A verification system according to claim 3, wherein said control signal validation means further comprises validation and sequence monitoring means for monitoring said configuration of said waveform for identifying waveform validity against defined valid waveforms, and for identifying a sequence of valid waveforms against defined allowable sequences, wherein said validation and sequence monitoring means generates at least one verified control signal to said drive signal generating means when the configuration of said waveform corresponds to said defined valid waveforms and defined allowable sequences, and generates at least one error signal to said error detection means when the configuration of said waveform deviates from either said defined valid waveforms or defined allowable sequences.

5. A verification system according to claim 3, wherein said period monitoring means comprises means for debouncing said control signal.

6. A verification system according to claim 1 wherein said sensing means includes a first detection means for identifying a condition of operation of said actuating means and a second detection means for identifying a condition of operation of said digital control system, wherein said error detection means is responsive to said first detection means of said sensing means.

7. A verification system according to claim 6, wherein said actuating means comprises a plurality of relays for generating a plurality of output signals, with at least a first relay providing at least one output to said first detection means and at least a second relay providing at least one output to said second detection means.

8. A verification system according to claim 7, wherein said actuating means comprises four relays, with three relays being in communication with said first detection means and one relay being in communication with said second detection means.

9. A digital control system for electro-mechanical equipment comprising:

control means for generating at least one control signal;

control signal validation means receiving said control signal for verifying said control signal and generating at least one verified control signal in response thereto;

drive means responsive to at least one drive signal for providing at least one operating signal;

drive validation means responsive to said operating signal for verifying a condition of operation of said drive means and generating at least one verified drive signal in response thereto;

actuating means responsive to said operating signal for generating at least one output signal for controlling said electro-mechanical equipment;

sensor means including a first detection means responsive to said output signal for verifying a condition of operation of said actuating means and generating at least one verified output signal in response thereto, said sensor means further including a second detection means responsive to said output signal for identifying a condition of operation of said electro-mechanical equipment associated with said digital control system;

error detection means responsive to said verified control signal of said control signal validation means, verified drive signal of said drive validation means and said verified output signal of said sensor means for generating at least one error signal; and drive signal generating means responsive to said verified control signal of said control signal validation means and said error signal from said error detection means for generating said at least one drive signal to said drive means.

10. A digital control system according to claim wherein said control signal defines a waveform of a defined configuration including at least one high period and at least one low period.

11. A digital control system according to claim 10, wherein said control signal validation means comprises period monitoring means for monitoring said high periods and said low periods of said control signal against defined limits, wherein said period monitoring means provides at least one error signal to said error detection means when said defined limits are exceeded.

12. A digital control system according to claim 11, wherein said control signal validation means further comprises validation and sequence monitoring means for monitoring said configuration of said waveform for identifying waveform validity against defined valid waveforms, and for identifying a sequence of valid waveforms against defined allowable sequences, wherein said validation and sequence monitoring means generates said verified control signal to said drive signal generating means when the configuration of said waveform corresponds to said defined valid waveforms and defined allowable sequences, and generates at least one error signal to said error detection means when the configuration of said waveform deviates from either said defined valid waveforms or defined allowable sequences.

13. A digital control system according to claim 11, wherein said period monitoring means comprises means for debouncing said control signal.

14. A digital control system according to claim 9, wherein said actuating means comprises at least one relay.

15. A digital control system according to 14, wherein said actuating means comprises a plurality of relays for generating a plurality of output signals, with at least a first relay providing at least one output signal to said first detection means and at least a second relay providing at least one output signal to said second detection means.

16. A digital control system according to claim 15, wherein said output signal of said first relay provides a condition of operation of said electro-mechanical equipment.

17. A digital control system according to claim 9, wherein said control means receives said error signal from said error detection means, with said control means further including means for identifying a condition of said error detection means.

18. A method for verifying operation of a digital control system for electro-mechanical equipment, said method including the steps of:

generating at least one control signal;

verifying said control signal and generating at least one verified control signal in response thereto;

generating at least one operating signal in response to at least one drive signal;

verifying said operating signal and generating at least one verified drive signal in response thereto;

generating at least one output signal in response to said operating signal for controlling said electro-mechanical equipment;

verifying said output signal and generating at least one verified output signal in response thereto;

generating at least one error signal in response to said verified control signal, verified drive signal and verified output signal; and generating said at least one drive signal in response to said verified control signal and said error signal.

19. A method according to claim 18, wherein the step of verifying said output signal further includes the step of identifying a condition of operation of said electro-mechanical equipment associated with said digital control system.

20. A method according to claim 18, wherein said control signal defines a waveform of a defined configuration including at least one high period and at least one low period, wherein the method further includes the steps of monitoring said high periods and said low periods of said control signal against defined limits and generating at least one error signal when said defined limits are exceeded.

21. A method according to claim 20 further including the step of monitoring the configuration of said waveform for identifying waveform validity against defined valid waveforms and for identifying a sequence of valid waveforms against defined allowable sequences, the method further including the step of generating said verified control signal when the configuration of said waveform corresponds to said defined valid waveforms and defined allowable sequences, and generating at least one error signal when the configuration of said waveform deviates from either said defined valid waveforms or defined allowable sequences.

22. A method according to claim 20, wherein the step of monitoring said waveform further includes the step of debouncing said control signal.

23. A method according to claim 18, wherein the step of verifying said output signal and generating a verified output signal further includes the step of identifying a condition of said verified output signal.

24. A method according to claim 18, wherein the step of generating an error signal further includes the step of identifying a condition of operation corresponding to said error signal.

* * * * *

UNITED STATES PATENT AND TRADEMARK OFFICE
CERTIFICATE OF CORRECTION

PATENT NO. : 5,719,559

DATED : February 17, 1998

INVENTOR(S) : Kenneth R. Talbott, et al.

It is certified that error appears in the above-identified patent and that said Letters Patent is hereby corrected as shown below:

In Column 4, line 62, after the word "means" please insert --24.--; and
In Column 13, line 9, in claim 10, between the word "claim" and the word "wherein" please insert --9, --

Signed and Sealed this

Twenty-eighth Day of April, 1998

Attest:

BRUCE LEHMAN

Attesting Officer

Commissioner of Patents and Trademarks